United States Patent
Kapustka

(10) Patent No.: US 8,215,901 B2
(45) Date of Patent: Jul. 10, 2012

(54) GAS TURBINE ENGINES AND RELATED SYSTEMS INVOLVING OFFSET TURBINE FRAME STRUTS

(75) Inventor: Theodore W. Kapustka, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 1251 days.

(21) Appl. No.: 11/949,206

(22) Filed: Dec. 3, 2007

(65) Prior Publication Data

US 2009/0142182 A1 Jun. 4, 2009

(51) Int. Cl.
*F01D 25/16* (2006.01)
(52) U.S. Cl. .......................... 415/142; 60/796
(58) Field of Classification Search ............... 415/142, 415/229; 60/796, 797, 268, 39.162
See application file for complete search history.

(56) References Cited

U.S. PATENT DOCUMENTS

| | | | |
|---|---|---|---|
| 4,023,350 A | 5/1977 | Hovan et al. | |
| 4,375,906 A | 3/1983 | Roberts et al. | |
| 4,478,551 A | 10/1984 | Honeycutt, Jr. et al. | |
| 4,979,872 A | 12/1990 | Myers et al. | |
| 5,076,049 A * | 12/1991 | Von Benken et al. | 60/797 |
| 5,433,584 A | 7/1995 | Amin et al. | |
| 5,791,789 A | 8/1998 | Van Duyn et al. | |
| 6,331,078 B1 | 12/2001 | Van Duyn | |
| 6,792,758 B2 | 9/2004 | Dowman | |
| 6,944,580 B1 | 9/2005 | Blume et al. | |
| 7,100,358 B2 | 9/2006 | Gekht et al. | |

* cited by examiner

*Primary Examiner* — Dwayne J White
(74) *Attorney, Agent, or Firm* — Carlson, Gaskey & Olds, P.C.

(57) ABSTRACT

Gas turbine engines and related systems involving offset hub struts are provided. In this regard, a representative bearing assembly for a gas turbine engine includes: a bearing operative to support a rotatable shaft; an annular hub positioned about the bearing; and an annular array of struts extending radially outwardly from the hub, at least two of the struts being positioned in different planes, the planes being oriented transversely with respect to the rotatable shaft. The method of assembling the struts by mounting first and second pluralities of struts, each plurality in a common plane, between the hub and the turbine exhaust case, with the second plurality of struts longitudinally offset from the first plurality of struts.

16 Claims, 4 Drawing Sheets

GAS TURBINE ENGINES AND RELATED SYSTEMS INVOLVING OFFSET TURBINE FRAME STRUTS

BACKGROUND

1. Technical Field

The disclosure generally relates to gas turbine engines.

2. Description of the Related Art

It is generally acknowledged that gas turbine engines for aircraft and other uses have a tendency to vibrate and generate noise at certain load ratings. To improve engine performance, it is desirable to reduce vibrations by strengthening the components of the engine and increasing the durability of the engine without increasing the weight of the engine. Also, it is desirable to shield the components of the engine from high temperatures where practical.

In the turbine case of a gas turbine engine, there are radially extending struts that are disposed in the path of the hot gases being exhausted from the turbine. The struts extend radially with respect to a longitudinal axis of the engine. The struts extend radially inwardly from the annular turbine exhaust case, through the path of the hot exhaust gases toward the longitudinal axis of the engine to a single axial location that is centrally located on the hub or "torque box." As such, the struts are disposed in a single plane, positioned at an axial location as measured along the longitudinal axis of the engine. The struts support the hub, which, in turn, supports the bearings of the turbine. The struts, hub, bearings and other components of the engine are constructed in an attempt to withstand the engine vibrations and other load-bearing forces, such as gyroscopic forces and gravitational or G forces.

Because of the extreme heat of the exhaust gases flowing about the struts, it has become common practice to shield the struts from the high temperature and velocity of the exhaust gas by applying fairings about the struts. Typically, the fairings are aerodynamically shaped and tend to divert the hot gases around the struts.

It is desirable to make the struts relatively thick to increase the strength of the struts. However, by enlarging the breadth of the struts, the enlarged struts require more lateral space. The enlarged struts cause the fairings that are adjacent the struts to be larger and the larger fairings tend to apply more resistance to the flow of the hot gases through the turbine section.

It is also desirable to make the struts and the adjacent fairings relatively thin to reduce the drag associated with the fairings. However, by reducing the breadth of the fairings and the associated struts, the strength of the struts is also reduced. Unfortunately, the reduced strength of the struts tends to allow the hub to be more susceptible to the above described forces that may result primarily due to the offset bearing loads carried by the hub.

SUMMARY

Gas turbine engines and related systems involving a hub supported by offset struts are provided. In this regard, an exemplary embodiment of a bearing assembly for a gas turbine engine comprises: a bearing operative to support a rotatable shaft; an annular hub positioned concentrically about the bearing; and an annular array of struts extending radially outwardly from the hub, at least two of the struts being positioned in different planes, the planes being oriented transversely with respect to the rotatable shaft.

An exemplary embodiment of a gas turbine engine comprises: at least one set of rotatable blades operative to engage a stream of oncoming gas moving in a longitudinal, annular path through the engine; an annular turbine exhaust case positioned downstream of the rotatable blades and being operative to exhaust the gas; an annular hub positioned concentrically within the turbine exhaust case; and an annular array of struts positioned across the gas path and extending radially between the hub and the turbine exhaust case, at least one of the struts being longitudinally offset with respect to at least another of the struts.

Another exemplary embodiment of a gas turbine engine comprises: an annular turbine exhaust case; a hub positioned concentrically within the turbine exhaust case; a first strut connected to and extending substantially radially from the hub to the turbine exhaust case; and a second strut connected to and extending substantially radially from the hub to the turbine exhaust case, the second strut being longitudinally offset, at the hub, with respect to the first strut.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Gas turbine engines and related systems involving a hub with offset struts are provided, and exemplary embodiments will be described in detail. In some embodiments, some of the struts are connected to the hub at different distances along the length of the hub from others of the struts. The length of the hub is measured along the longitudinal axis of the engine. Because the connections of the struts to the hub are longitudinally offset with respect to a single axial location that is centrally located on the hub, these offset connections tend to facilitate stabilizing the position of the hub within the turbine exhaust case. In some of these embodiments, each strut may be associated with fairings adjacent the struts to facilitate shielding the struts from excessive heat of the exhaust gases of the engine.

Figure 1:
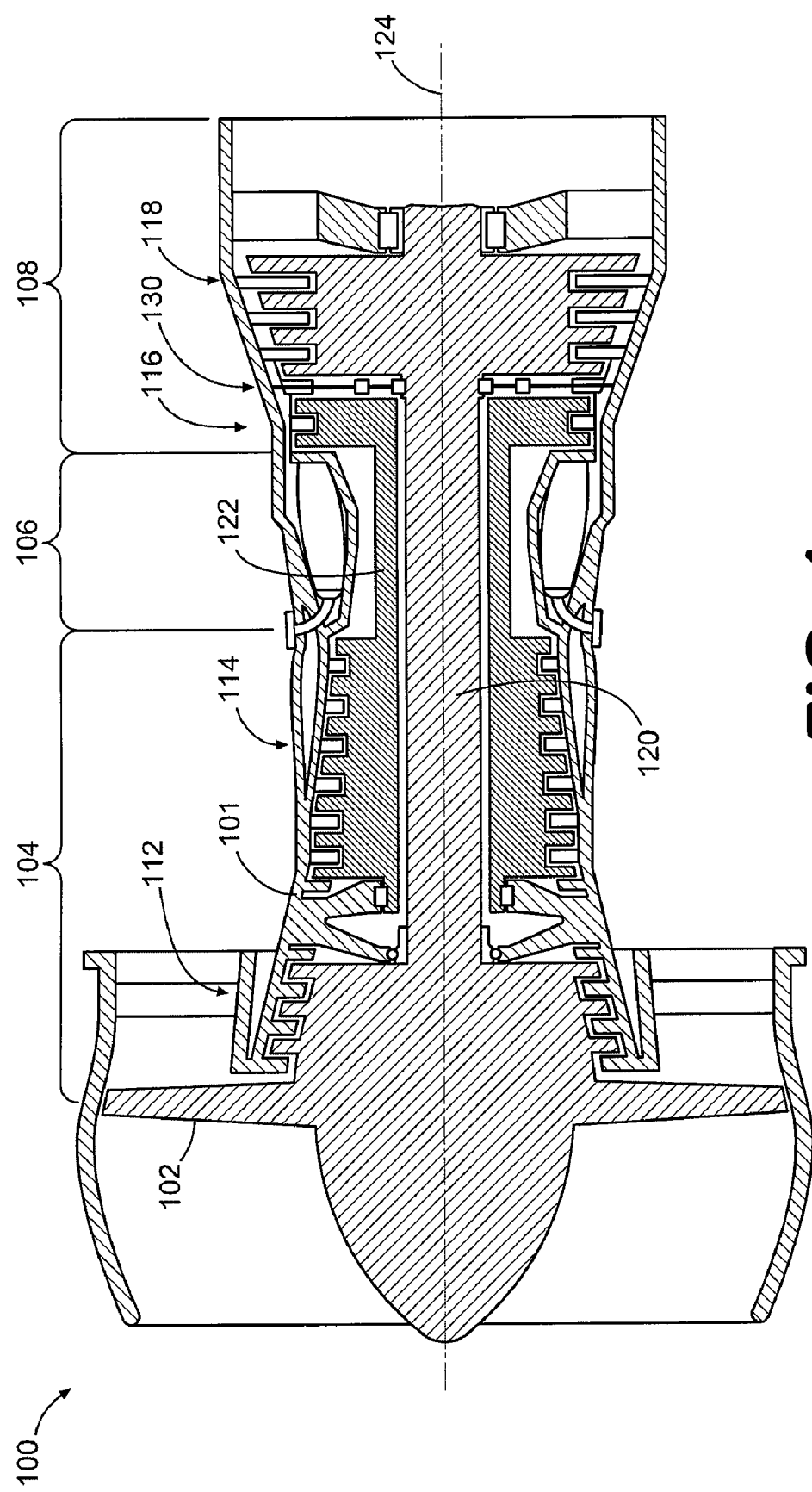
FIG. 1 is a side cross-sectional view of an exemplary embodiment of a gas turbine engine.

Referring now to the drawings, FIG. 1 is a diagram depicting a representative embodiment of a gas turbine engine 100. Although engine 100 is configured as a dual-spool turbofan, there is no intention to limit the invention to use with turbofans (or dual-spool configurations) as use with other types (and configurations) of gas turbine engines is contemplated.

As shown in FIG. 1, gas turbine engine 100 incorporates an engine casing 101 that houses a fan 102, a compressor section 104, a combustion section 106 and a turbine section 108. Compressor section 104 includes a low-pressure compressor 112 and a high-pressure compressor 114, and turbine section 108 includes a high-pressure turbine 116 and a low-pressure turbine 118. A low shaft 120 interconnects low-pressure turbine 118 with low-pressure compressor 112, and a high shaft 122 interconnects high-pressure turbine 116 with high-pressure compressor 114. Notably, shafts 120 and 122 are supported by a bearing assembly 130, which generally includes bearings for the shafts and an associated hub and struts that support the bearings (described in detail later). The length of the hub and the longitudinal location of struts are herein described as measured along a longitudinal axis 124 of the gas turbine engine 100.

During the operation of the gas turbine engine 100, the combustion section 106 supplies fuel to air that is being drawn through the engine by the compressor section 104. As a result, the combustion of the fuel creates a hot gas stream that flows through turbine section 108. The hot gas stream impinges upon the blades of the turbines 116, 118 to facilitate driving the corresponding compressors through shafts 120, 122.

Figure 2:
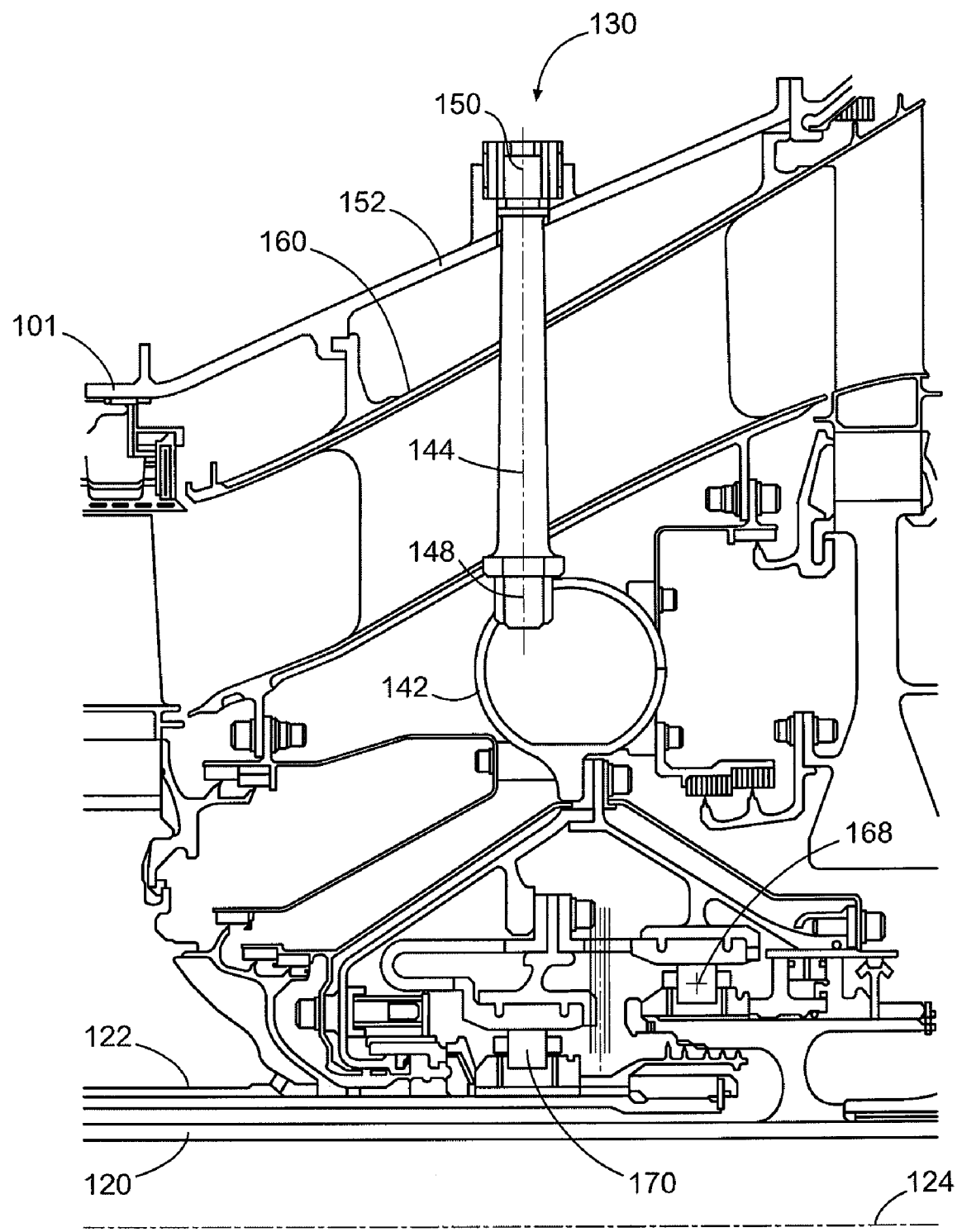
FIG. 2 is a cross-sectional view of the upper half of a turbine exhaust case of the embodiment of FIG. 1, showing a strut positioned in a forward offset position when connected to a hub.
Figure 3:
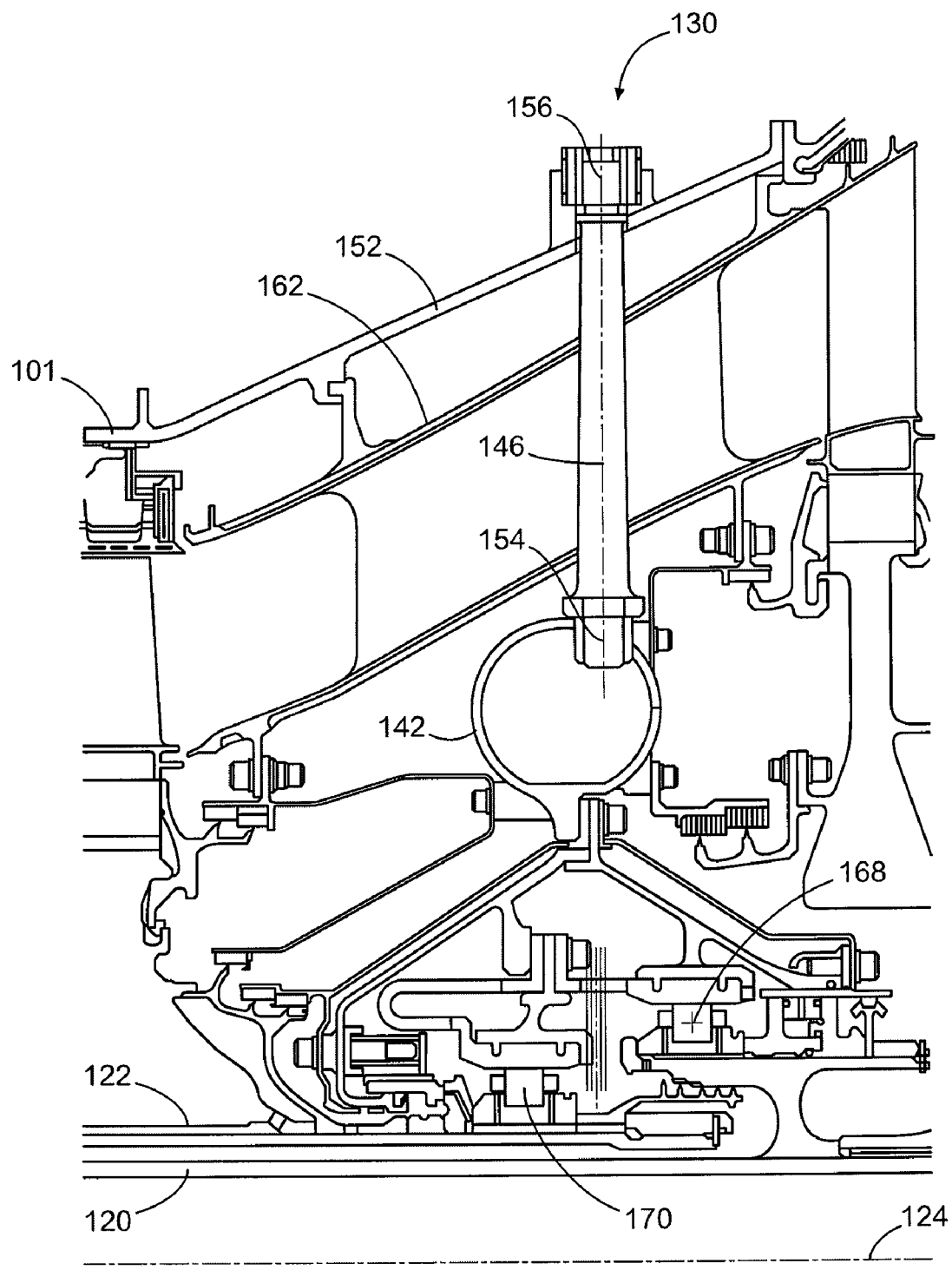
FIG. 3 is a cross-sectional view of the upper half of the turbine exhaust case of the embodiment of FIG. 1, but showing another strut that is positioned in an aft offset position when connected to the hub.

Generally, the components of the gas turbine engine 100 tend to vibrate and G forces and gyroscopic forces tend to be applied through the bearings to the hub 142 (shown in FIGS. 2 and 3). In particular, forces are transmitted between the hub 142, struts 144, 146 and engine casing 101. Notably, the exemplary bearing assembly 130 includes offset struts 144, 146.

As shown in FIGS. 2 and 3, bearing assembly 130 includes a low bearing 168 (which supports shaft 120) and a high bearing 170 (which supports shaft 122). The bearings 168, 170 interconnect with the hub 142.

Figure 4:
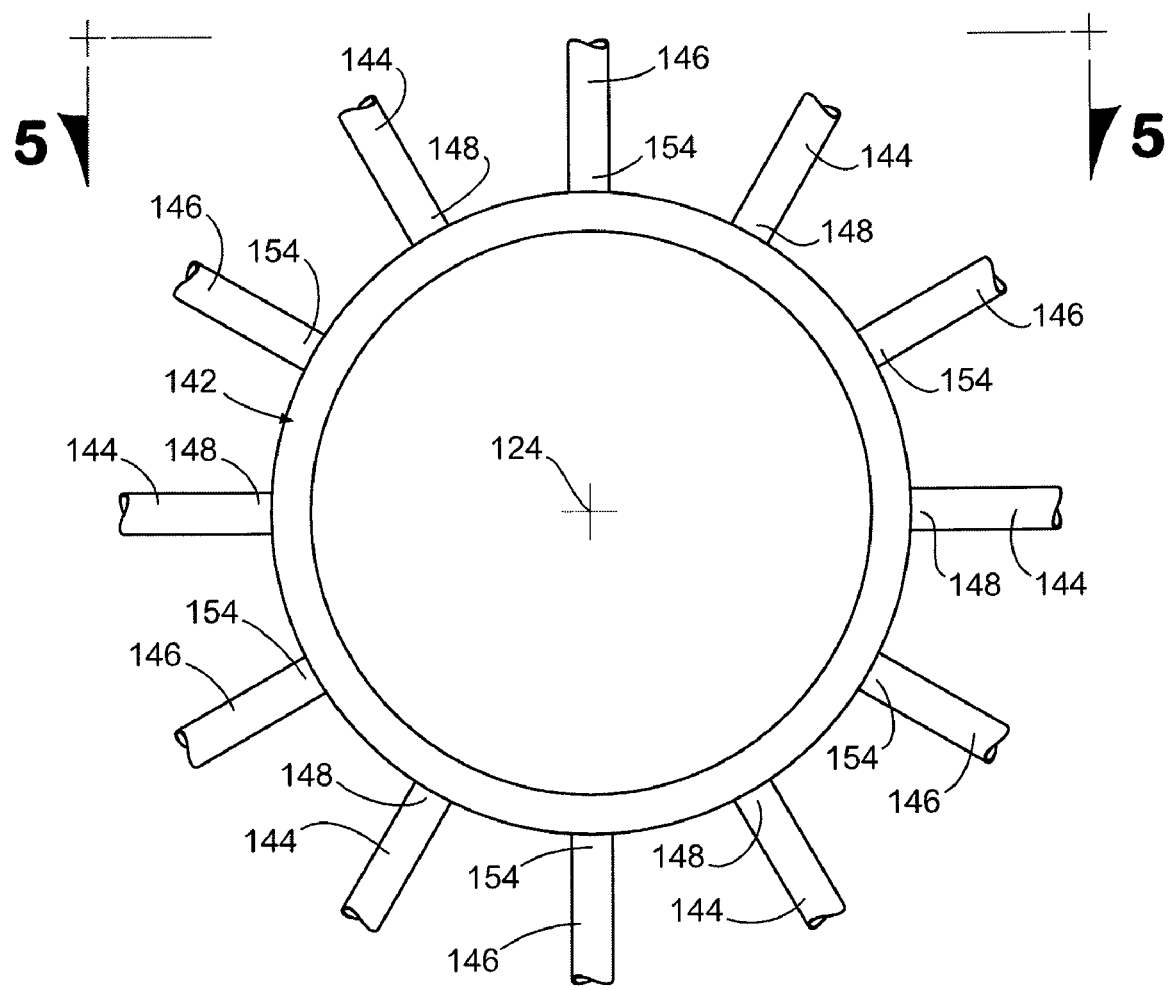
FIG. 4 is an end view of the hub and the adjacent portions of the struts connected to the hub, with the fairings removed from the struts.
Figure 5:
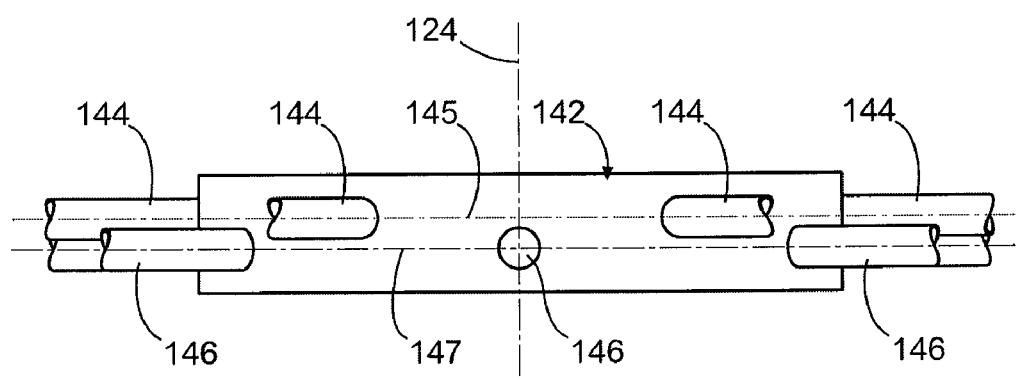
FIG. 5 is a top view of the hub and the adjacent portions of the struts with the fairings removed from the struts, taken along lines 5-5 of FIG. 4.

As shown in FIGS. 4 and 5, multiple struts are attached to the hub 142 and extend radially outwardly from the hub 142 to the engine casing 101. Both the forward struts 144 and the aft struts 146 extend radially from the longitudinal axis 124 of the engine. The struts 144, 146 are connected to a turbine exhaust case portion 152 of the engine casing 101. Notably, the embodiment of FIGS. 2 and 3 includes two sets of substantially cylindrical struts, with the forward struts 144 shown in FIG. 2 and the aft struts 146 shown in FIG. 3. While twelve struts are shown in FIG. 4, in other embodiments other numbers of sets and configurations of struts may be used.

As shown in FIGS. 4 and 5, forward struts 144 are aligned in a forward plane 145 that is oriented transversely with respect to the longitudinal axis 124 of the gas turbine engine 100 and shafts 120, 122. As shown in FIG. 4, the forward struts 144 are formed in a radial array about the hub 142 with the inner end portions 148 mounted to the hub 142 and the outer portions 150 (FIG. 2) mounted to the engine casing 101. In the exemplary embodiment, the inner end portions 148 of the forward struts 144 are threadedly mounted into threaded openings (not shown) formed in the hub 142.

Likewise, the aft struts 146 are aligned in an aft plane 147 that is oriented transversely with respect to the longitudinal axis 124 of the gas turbine engine 100 and shafts 120, 122. The aft struts 146 of the rearward array of struts also are threadedly connected at their inner end portions 154 to the hub 142, and their outer end portions 156 are connected to the engine casing 101. In other embodiments, the struts 144, 146 may be connected at their inner and outer ends by various means to the hub 142 and engine casing 101, such as by threads, welding, pins, or other means.

Fairings, such as fairings 160 of FIG. 2 of the forward struts 144, are adjacent the intermediate portion of each of the forward struts 144 for the purpose of directing the hot gases about the forward struts 144. Likewise, fairings 162 of FIG. 3 are adjacent the intermediate portion of each of the aft struts 146 for the same purpose as the forward struts 144. The fairings 160, 162 may be attached at their inner and outer ends to the hub 142 and to the engine casing 101, respectively, thereby also tending to shield the hub and the engine casing from the hot gases. While FIGS. 4 and 5 do not show the fairings so as to better illustrate the struts, it will be understood that a fairing may be positioned about some or all of the struts.

Since the array of forward struts 144 are longitudinally offset from the array of aft struts 146, i.e., struts 144 and 146 reside in different planes that are oriented transversely with respect to the longitudinal axis 124 of the engine, as shown in FIGS. 4 and 5. Thus, the hub 142 is more rigidly supported than the support typically provided by similarly sized struts arranged in an annular, single plane arrangement. Therefore, the vibrations and other forces applied to the hub 142 by the load from the bearings 168 and 170 tend to cause smaller deflections. In this arrangement, the struts 144, 146 provide stronger support than when arranged in a single annular plane.

By using longitudinally offset forward and aft struts 144 and 146, a stronger support can be provided to the hub 142 and the dimensions of the struts 144, 146 can be reduced without compromising the ability of the struts 144, 146 to stabilize the hub 142. Thus, additional stability is applied to the hub 142 with a reduction in the breadth of the struts 144, 146, thereby allowing the adjacent fairings (e.g., fairings 160, 162) to be thinner. This facilitates reducing the drag associated with the fairings.

In some embodiments, the hub 142 is formed in a substantially cylindrical shape and openings are formed through the hub 142 at the positions where the inner end portions 148, 154 of the struts 144, 146 are fastened. However, another exemplary hub may have a substantially non-circular shape if desired, such as an octangular shape or other shape that presents flat surfaces for receiving the inner end portions of the struts. For example, if a hub is to be supported by twelve struts, the hub may be formed in a substantially circular shape having twelve circumferentially spaced flats for receiving the inner end portions of the struts.

Forward struts 144 may be both longitudinally and circumferentially offset from aft struts 146. In this regard, struts from one array may be spaced further apart from each other than the struts of another array. Additionally or alternatively, the spacing between the arrays may be different than the spacing between adjacent struts of a given array.

While the longitudinal spacing of the struts 144, 146 in FIGS. 2 and 3 may appear to demonstrate a substantial separation of the arrays from each other, it will be understood that arrays of the struts 144, 146 may be positioned closer together as shown in FIG. 5 so that they overlap one another in a common plane. However, increased longitudinal spacing between the arrays of struts tends to facilitate increasing stability applied to the hub. In some embodiments, the struts are longitudinally spaced from one another a distance equal to about one diameter of a strut, but other longitudinal spacings may be used.

In some embodiments, both a forward strut and an aft strut may be adjacent a single fairing, such as when the forward and aft strut are positioned in longitudinal alignment with each other. This may be used for the purpose of providing the desired strength of the hub while leaving another position empty of a strut but having a substantially hollow fairing present in the empty position. This arrangement provides more space for routing of fluids or cooling air, for example, through the empty fairing to other portions of the engine.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A bearing assembly for a gas turbine engine having a rotatable shaft, the bearing assembly comprising:
   a bearing operative to support a rotatable shaft;
   an annular hub positioned about the bearing;
   an annular array of struts extending radially outwardly from the hub, at least two of the struts being positioned in different planes, the planes being oriented transversely with respect to a longitudinal axis of the gas turbine engine wherein the bearing is a first bearing operative to support a first rotatable shaft; and,
   a second bearing operative to support a second rotatable shaft wherein the annular hub is positioned concentrically about both the first bearing and the second bearing.

2. The bearing assembly of claim 1, wherein: the bearing assembly further comprises an annular array of fairings extending radially outwardly from the hub; and at least some of the struts extend through corresponding ones of the fairings.

3. The bearing assembly of claim 1, wherein said different planes comprise a forward plane and an aft plane, alternate ones of the struts are positioned in the forward plane and other alternate ones of the struts are positioned in the aft plane.

4. The bearing assembly of claim 1, wherein the struts are substantially cylindrical.

5. A gas turbine engine comprising:
   at least one set of rotatable blades operative to engage a combustion gas that flows in a longitudinal, annular gas path through the engine;
   an annular turbine exhaust case positioned downstream of the rotatable blades and being operative to exhaust the combustion gas;
   a hub positioned concentrically within the turbine exhaust case; and
   an annular array of struts positioned across the gas path and extending radially between the hub and the turbine exhaust case, at least one of the struts being longitudinally offset with respect to at least another of the struts wherein the gas turbine engine is a more than a one-spool gas turbine engine having a first shaft and a second shaft.

6. The gas turbine engine of claim 5, further comprising an annular array of fairings positioned across the gas path and extending radially between the hub and the turbine exhaust case, each of the fairings exhibiting a downstream taper.

7. The gas turbine engine of claim 6, wherein: each of the fairings has an outer end portion disposed at the turbine exhaust case and an inner end portion disposed at the hub; and each of the fairings is substantially hollow from the corresponding outer end portion to the corresponding inner end portion.

8. The gas turbine engine of claim 6, wherein at least one of the fairings is positioned about at least one of the struts.

9. The gas turbine engine of claim 5, wherein alternate ones of the struts positioned in planes that are longitudinally offset from others of the struts for stabilizing the hub.

10. The gas turbine engine of claim 5, wherein the struts are connected at different longitudinal locations of the hub for retarding tilting of the hub.

11. The gas turbine engine of claim 5, wherein the gas turbine engine is a turbofan gas turbine engine.

12. The gas turbine engine of claim 5, wherein: the gas turbine engine further comprises a first bearing operative to support the first shaft and a second bearing operative to support the second shaft; and the hub is operative to support the first bearing and the second bearing.

13. A method assembling a plurality of struts to a hub of a gas turbine engine that includes an annular turbine exhaust case and a hub positioned within the annular turbine exhaust case for supporting bearings of the engine, the method comprising:
   mounting a first plurality of struts between said hub and said turbine exhaust case in a radially extending array and in a first common plane from said hub to said turbine exhaust,
   mounting a second plurality of struts between said hub and said turbine exhaust in a radially extending array and in a second common plane from said hub to said turbine exhaust, with said second plurality of struts longitudinally offset from the first plurality of struts, wherein the step of mounting the second plurality of struts comprises mounting the second plurality of struts in positions circumferentially offset from the struts of the first plurality of struts.

14. The method of claim 13 and further including mounting fairings about the first and second plurality of struts.

15. A bearing assembly for a gas turbine engine having a rotatable shaft, the bearing assembly comprising:
   a bearing operative to support a rotatable shaft;
   an annular hub positioned about the bearing;
   a first annular array of struts extending radially outwardly from the hub in a first plane, and a second annular array of struts extending radially outwardly from the hub in a second plane wherein said array of struts in said first plane is circumferentially offset from said array of said struts in said second plane.

16. The bearing assembly of claim 15 wherein spokes in said first array alternate with spokes in said second array circumferentially about said hub.

* * * * *